(12) United States Patent
Cole et al.

(10) Patent No.: US 12,216,211 B2
(45) Date of Patent: Feb. 4, 2025

(54) SYSTEM AND METHOD FOR CORRECTING SATELLITE OBSERVATIONS

(71) Applicant: Swift Navigation, Inc., San Francisco, CA (US)

(72) Inventors: Anthony Mark Cole, San Francisco, CA (US); Fergus MacPherson Noble, San Francisco, CA (US); James Tidd, San Francisco, CA (US); Sébastien Carcanague, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 18/514,103

(22) Filed: Nov. 20, 2023

(65) Prior Publication Data
US 2024/0085567 A1    Mar. 14, 2024

Related U.S. Application Data

(62) Division of application No. 18/079,640, filed on Dec. 12, 2022, now abandoned.

(60) Provisional application No. 63/288,381, filed on Dec. 10, 2021.

(51) Int. Cl.
*G01S 19/07* (2010.01)
*G01S 19/44* (2010.01)

(52) U.S. Cl.
CPC ............ *G01S 19/073* (2019.08); *G01S 19/44* (2013.01)

(58) Field of Classification Search
CPC ........ G01S 19/073; G01S 19/44; G01S 19/04; G01S 19/41; G01S 19/43
See application file for complete search history.

(56) References Cited

U.S. PATENT DOCUMENTS

| | | |
|---|---|---|
| 5,451,964 A | 9/1995 | Babu |
| 5,490,076 A | 2/1996 | Rawicz et al. |
| 5,610,614 A | 3/1997 | Talbot et al. |

(Continued)

FOREIGN PATENT DOCUMENTS

| | | |
|---|---|---|
| CA | 2718988 C | 1/2014 |
| CA | 3079279 A1 | 10/2020 |

(Continued)

OTHER PUBLICATIONS

Takasu, Tomojii , et al., "Kalman-Filter-Based Integer Ambiguity Resolution Strategy for Long-Baseline RTK with Ionosphere and Troposphere Estimation", Tokyo University of Marine Science and Technology, Japan, revised Oct. 3, 2010—11 pages.

(Continued)

*Primary Examiner* — Cassi J Galt
(74) *Attorney, Agent, or Firm* — Jeffrey Schox; Randy Mehlenbacher (57) ABSTRACT

A system or method for determining a satellite observation for a virtual reference station can include: determining a virtual reference station location, receiving a set of satellite observations at a reference station located at a reference station location, determining a first GNSS correction for the virtual reference station location and a second GNSS correction for the reference station location, and determining the satellite observation for the virtual reference station by combining the set of satellite observations, the first GNSS correction, and the second GNSS correction.

9 Claims, 5 Drawing Sheets

(56) References Cited

U.S. PATENT DOCUMENTS

| | | |
|---|---|---|
| 5,825,326 A | 10/1998 | Semler et al. |
| 5,867,411 A | 2/1999 | Kumar |
| 5,935,196 A | 8/1999 | Brodie et al. |
| 5,991,691 A | 11/1999 | Johnson |
| 6,009,376 A | 12/1999 | Brodie et al. |
| 6,127,968 A | 10/2000 | Lu |
| 6,205,400 B1 | 3/2001 | Lin |
| 6,317,688 B1 | 11/2001 | Bruckner et al. |
| 6,408,245 B1 | 6/2002 | An et al. |
| 6,424,914 B1 | 7/2002 | Lin |
| 6,427,122 B1 | 7/2002 | Lin |
| 6,453,237 B1 | 9/2002 | Fuchs et al. |
| 6,552,680 B1 | 4/2003 | Barber et al. |
| 6,628,231 B2 | 9/2003 | Mayersak |
| 6,647,340 B1 | 11/2003 | Pemble et al. |
| 6,691,066 B1 | 2/2004 | Brodie |
| 6,727,849 B1 * | 4/2004 | Kirk ............... G01S 19/44 342/464 |
| 6,735,264 B2 | 5/2004 | Miller |
| 6,753,810 B1 | 6/2004 | Yang et al. |
| 6,799,116 B2 | 9/2004 | Robbins |
| 6,816,117 B2 | 11/2004 | Fink et al. |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,298,325 B2 | 11/2007 | Krikorian et al. |
| 7,382,313 B1 | 6/2008 | Goad |
| 7,409,289 B2 | 8/2008 | Coatantiec et al. |
| 7,538,721 B2 | 5/2009 | Vollath et al. |
| 7,692,578 B2 | 4/2010 | Vollath et al. |
| 7,696,922 B2 | 4/2010 | Nicholson et al. |
| 7,746,272 B2 | 6/2010 | Vollath |
| 8,013,789 B2 | 9/2011 | Van et al. |
| 8,027,413 B2 | 9/2011 | Lillo et al. |
| 8,085,190 B2 | 12/2011 | Sengupta et al. |
| 8,089,402 B2 | 1/2012 | Maenpa et al. |
| 8,094,065 B2 | 1/2012 | Henkel |
| 8,134,497 B2 | 3/2012 | Janky et al. |
| 8,193,976 B2 | 6/2012 | Shen et al. |
| 8,255,155 B1 | 8/2012 | Crane et al. |
| 8,368,590 B2 | 2/2013 | Vollath et al. |
| 8,368,591 B2 | 2/2013 | Talbot et al. |
| 8,416,133 B2 | 4/2013 | Hatch et al. |
| 8,447,517 B2 | 5/2013 | Roh |
| 8,510,041 B1 | 8/2013 | Anguelov et al. |
| 8,542,146 B2 | 9/2013 | Vollath |
| 8,587,475 B2 | 11/2013 | Leandro |
| 8,610,624 B2 | 12/2013 | Savoy |
| 8,704,708 B2 | 4/2014 | Vollath |
| 8,704,709 B2 | 4/2014 | Vollath et al. |
| 8,756,001 B2 | 6/2014 | Georgy et al. |
| 8,760,343 B2 | 6/2014 | Milyutin et al. |
| 8,773,303 B2 | 7/2014 | Doucet et al. |
| 8,816,903 B2 | 8/2014 | Sengupta et al. |
| 8,825,456 B2 | 9/2014 | Vasudevan et al. |
| 8,830,121 B2 | 9/2014 | Vollath |
| 8,831,877 B2 | 9/2014 | Anguelov et al. |
| 8,847,820 B2 | 9/2014 | Landau et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,146,319 B2 | 9/2015 | Leandro |
| 9,182,497 B2 | 11/2015 | Geier et al. |
| 9,244,177 B2 | 1/2016 | Terashima |
| 9,405,012 B2 | 8/2016 | Doucet et al. |
| 9,405,016 B2 | 8/2016 | Yim |
| 9,417,330 B2 | 8/2016 | Revol et al. |
| 9,488,734 B2 | 11/2016 | Davain |
| 9,557,422 B1 | 1/2017 | Miller et al. |
| 9,568,321 B2 | 2/2017 | Bharadwaj et al. |
| 9,576,082 B2 | 2/2017 | Sparks et al. |
| 9,602,974 B2 | 3/2017 | Rudow et al. |
| 9,612,341 B2 | 4/2017 | Large et al. |
| 9,651,667 B2 | 5/2017 | Leandro et al. |
| 9,671,501 B2 | 6/2017 | Leandro et al. |
| 9,709,683 B2 | 7/2017 | Leandro et al. |
| 9,784,844 B2 | 10/2017 | Kana et al. |
| 9,857,474 B2 | 1/2018 | Tan et al. |
| 9,927,530 B2 | 3/2018 | Boyarski |
| 10,018,729 B2 | 7/2018 | Dunik et al. |
| 10,101,464 B2 | 10/2018 | Appleford et al. |
| 10,191,157 B2 | 1/2019 | Dai et al. |
| 10,260,888 B2 | 4/2019 | Takahashi |
| 10,267,924 B2 | 4/2019 | Ramanandan et al. |
| 10,274,606 B1 | 4/2019 | Phan et al. |
| 10,422,885 B2 | 9/2019 | Dai et al. |
| 10,459,593 B2 | 10/2019 | Tiwari et al. |
| 10,473,790 B2 | 11/2019 | Noble et al. |
| 10,564,296 B2 | 2/2020 | Hide et al. |
| 10,578,747 B2 | 3/2020 | Grgich et al. |
| 10,627,527 B2 | 4/2020 | Horn et al. |
| 10,677,933 B1 | 6/2020 | Gavrilets et al. |
| 10,690,775 B2 | 6/2020 | Jokinen |
| 10,802,160 B2 | 10/2020 | Dai et al. |
| 10,809,388 B1 | 10/2020 | Carcanague et al. |
| 10,871,579 B2 | 12/2020 | Segal et al. |
| 10,901,096 B2 | 1/2021 | Thrasher et al. |
| 11,035,961 B2 | 6/2021 | Horn et al. |
| 11,131,774 B2 | 9/2021 | Miya et al. |
| 11,143,762 B2 | 10/2021 | Takahashi et al. |
| 11,156,718 B2 | 10/2021 | Takeda |
| 11,187,813 B2 | 11/2021 | Brandl et al. |
| 11,221,418 B2 | 1/2022 | Sleewaegen et al. |
| 11,237,276 B2 | 2/2022 | Kleeman |
| 11,255,976 B2 | 2/2022 | Strobel et al. |
| 11,259,141 B2 | 2/2022 | Li et al. |
| 11,300,689 B2 | 4/2022 | Noble et al. |
| 11,327,182 B2 | 5/2022 | Zalewski et al. |
| 11,333,772 B2 | 5/2022 | Del Regno et al. |
| 11,378,699 B2 | 7/2022 | Segal et al. |
| 11,422,269 B2 | 8/2022 | Ookubo et al. |
| 11,422,271 B2 | 8/2022 | Talbot et al. |
| 11,480,690 B2 | 10/2022 | Grgich et al. |
| 11,550,067 B2 | 1/2023 | Reimer et al. |
| 11,624,838 B2 | 4/2023 | Fine et al. |
| 11,693,120 B2 | 7/2023 | Angelo et al. |
| 11,733,397 B2 | 8/2023 | Reimer et al. |
| 11,953,608 B2 | 4/2024 | Hamada et al. |
| 2002/0097184 A1 | 7/2002 | Mayersak |
| 2002/0120400 A1 | 8/2002 | Lin |
| 2002/0180641 A1 | 12/2002 | Fink et al. |
| 2003/0081705 A1 | 5/2003 | Miller |
| 2003/0085840 A1 | 5/2003 | Benner et al. |
| 2004/0006424 A1 | 1/2004 | Joyce et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2005/0203702 A1 | 9/2005 | Sharpe et al. |
| 2006/0074558 A1 | 4/2006 | Williamson et al. |
| 2007/0120733 A1 | 5/2007 | Vollath et al. |
| 2007/0126629 A1 | 6/2007 | Krikorian et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0224969 A1 | 9/2009 | Kolb |
| 2009/0243929 A1 | 10/2009 | Sengupta et al. |
| 2009/0262013 A1 | 10/2009 | Vollath |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0207810 A1 | 8/2010 | Terashima |
| 2010/0283675 A1 | 11/2010 | McAree et al. |
| 2010/0324822 A1 | 12/2010 | Coatantiec et al. |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |

(56) References Cited

U.S. PATENT DOCUMENTS

| | | |
|---|---|---|
| 2011/0156949 A1 | 6/2011 | Vollath et al. |
| 2011/0187589 A1 | 8/2011 | Gaal et al. |
| 2011/0187590 A1 | 8/2011 | Leandro |
| 2011/0260914 A1 | 10/2011 | Vollath et al. |
| 2011/0267226 A1 | 11/2011 | Talbot et al. |
| 2011/0316740 A1 | 12/2011 | Waters et al. |
| 2012/0112961 A1 | 5/2012 | Sengupta et al. |
| 2012/0146847 A1 | 6/2012 | Janky et al. |
| 2012/0154210 A1 | 6/2012 | Landau et al. |
| 2012/0154214 A1 | 6/2012 | Leandro |
| 2012/0154215 A1 | 6/2012 | Vollath et al. |
| 2012/0173195 A1 | 7/2012 | Opshaug et al. |
| 2012/0176271 A1 | 7/2012 | Dai et al. |
| 2012/0286991 A1 | 11/2012 | Chen et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2013/0325328 A1 | 12/2013 | Anguelov et al. |
| 2013/0335264 A1 | 12/2013 | Revol et al. |
| 2014/0002300 A1 | 1/2014 | Leandro et al. |
| 2014/0015712 A1 | 1/2014 | Leandro et al. |
| 2014/0062765 A1 | 3/2014 | Brenner |
| 2014/0062776 A1 | 3/2014 | Ferguson et al. |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2014/0266876 A1 | 9/2014 | Tan et al. |
| 2014/0288825 A1 | 9/2014 | Czompo et al. |
| 2014/0375495 A1 | 12/2014 | Fleming et al. |
| 2015/0019464 A1 | 1/2015 | Nguyen-Tuong et al. |
| 2015/0168559 A1 | 6/2015 | Salazar et al. |
| 2015/0173037 A1 | 6/2015 | Pijl |
| 2015/0260848 A1 | 9/2015 | Mundt et al. |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0116601 A1 | 4/2016 | Horn et al. |
| 2016/0195617 A1 | 7/2016 | Phatak et al. |
| 2016/0320493 A1 | 11/2016 | Wu et al. |
| 2017/0010936 A1 | 1/2017 | Daoud et al. |
| 2017/0131407 A1 | 5/2017 | Dunik et al. |
| 2017/0192102 A1 | 7/2017 | Wietfeldt |
| 2017/0254904 A1 | 9/2017 | Zhodzishsky et al. |
| 2017/0269216 A1 | 9/2017 | Dai et al. |
| 2017/0269222 A1 | 9/2017 | Dai et al. |
| 2017/0269227 A1 | 9/2017 | Dai et al. |
| 2017/0269231 A1 | 9/2017 | Dai et al. |
| 2017/0299730 A1 | 10/2017 | Lie et al. |
| 2017/0299731 A1 | 10/2017 | Lie et al. |
| 2017/0322313 A1 | 11/2017 | Revol et al. |
| 2018/0091939 A1 | 3/2018 | Venkatraman et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0172838 A1 | 6/2018 | Junker et al. |
| 2018/0180743 A1 | 6/2018 | Hide et al. |
| 2018/0188032 A1 | 7/2018 | Ramanandan et al. |
| 2018/0246217 A1 | 8/2018 | Wuebbena |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0078895 A1 | 3/2019 | Ma et al. |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0302274 A1 | 10/2019 | Berntorp et al. |
| 2019/0339396 A1 | 11/2019 | Turunen |
| 2019/0369265 A1 | 12/2019 | Jokinen |
| 2019/0383948 A1 | 12/2019 | Hoeferlin et al. |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0041658 A1 | 2/2020 | Laurichesse |
| 2020/0096649 A1 | 3/2020 | Brandl et al. |
| 2020/0158886 A1* | 5/2020 | Segal .................... G01S 5/0054 |
| 2020/0209406 A1 | 7/2020 | Lin et al. |
| 2020/0233056 A1 | 7/2020 | Dolgov et al. |
| 2020/0257002 A1 | 8/2020 | Henkel |
| 2020/0271795 A1 | 8/2020 | Horn et al. |
| 2020/0348422 A1 | 11/2020 | Carcanague et al. |
| 2020/0408926 A1 | 12/2020 | Carcanague et al. |
| 2021/0026374 A1 | 1/2021 | Burghardt et al. |
| 2021/0033735 A1 | 2/2021 | Kleeman |
| 2021/0116579 A1 | 4/2021 | Rezaei |
| 2021/0141099 A1 | 5/2021 | Gunnarsson et al. |
| 2021/0165104 A1 | 6/2021 | Zalewski et al. |
| 2021/0165111 A1 | 6/2021 | Zalewski |
| 2021/0215831 A1 | 7/2021 | Takeda |
| 2021/0255336 A1 | 8/2021 | Noble et al. |
| 2021/0333413 A1 | 10/2021 | Zyryanov |
| 2021/0372793 A1 | 12/2021 | Nikulin et al. |
| 2021/0405213 A1 | 12/2021 | Tuck et al. |
| 2022/0011443 A1 | 1/2022 | De Wilde et al. |
| 2022/0018969 A1 | 1/2022 | Fine et al. |
| 2022/0057523 A1 | 2/2022 | Lee |
| 2022/0058322 A1 | 2/2022 | Brandl et al. |
| 2022/0107427 A1 | 4/2022 | Kleeman et al. |
| 2022/0163677 A1 | 5/2022 | Muthuraman et al. |
| 2022/0171053 A1 | 6/2022 | Park et al. |
| 2022/0317310 A1 | 10/2022 | He et al. |
| 2022/0397684 A1 | 12/2022 | Kee et al. |
| 2023/0026395 A1 | 1/2023 | Reimer et al. |
| 2023/0140535 A1 | 5/2023 | Ma et al. |
| 2023/0184956 A1 | 6/2023 | Cole et al. |
| 2023/0280476 A1 | 9/2023 | Reimer et al. |

FOREIGN PATENT DOCUMENTS

| | | |
|---|---|---|
| CN | 101166995 A | 4/2008 |
| CN | 103197327 A | 7/2013 |
| CN | 103760573 A | 4/2014 |
| CN | 104236522 A | 12/2014 |
| CN | 104732085 A | 6/2015 |
| CN | 106338738 A | 1/2017 |
| CN | 106970404 A | 7/2017 |
| CN | 107085626 A | 8/2017 |
| CN | 105629263 B | 4/2019 |
| CN | 107422354 B | 6/2019 |
| CN | 110727002 A | 1/2020 |
| CN | 111272174 A | 6/2020 |
| CN | 109714421 B | 8/2021 |
| CN | 111624630 B | 2/2022 |
| CN | 114174850 A | 3/2022 |
| DE | 102017212603 A1 | 1/2019 |
| DE | 102018202223 A1 | 8/2019 |
| EP | 0244091 A2 | 11/1987 |
| EP | 0461557 B1 | 12/1997 |
| EP | 1729145 A1 | 12/2006 |
| EP | 2128841 A1 | 12/2009 |
| EP | 2602752 A1 | 6/2013 |
| EP | 1839070 B2 | 4/2014 |
| EP | 2966477 A1 | 1/2016 |
| EP | 2995975 A1 | 3/2016 |
| EP | 3035080 A1 | 6/2016 |
| EP | 2156214 B1 | 8/2018 |
| EP | 3627188 A1 | 3/2020 |
| EP | 3566021 B1 | 3/2021 |
| EP | 3809208 A1 | 4/2021 |
| EP | 3828595 A1 | 6/2021 |
| EP | 3963352 A1 | 3/2022 |
| KR | 101181990 B1 | 9/2012 |
| WO | 02061449 A1 | 8/2002 |
| WO | 2017046914 A1 | 3/2017 |
| WO | 2017070732 A1 | 5/2017 |

(56) References Cited

FOREIGN PATENT DOCUMENTS

| | | | |
|---|---|---|---|
| WO | 2018188845 A1 | 10/2018 | |
| WO | 2019063645 A1 | 4/2019 | |
| WO | 2020214680 A1 | 10/2020 | |
| WO | 2020240307 A1 | 12/2020 | |

OTHER PUBLICATIONS

Takenaka, et al., "Geolocation Correction for Geostationary Satellite Observations by a Phase-Only Correlation Method Using a Visible Channe", MPDI, Aug. 1, 2020, retrieved on Oct. 3, 2023. Retrieved from the internet <URL: http://www.mdpi.com/2072-4292/12/15/2472>.

Tanedo, Flip, "Notes on non-holonomic constraints", For P3318, Spring 2013, https://www.physics.uci.edu/~tanedo/files/teaching/P3318S13/Sec_05_nonholonomic.pdf.

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation a Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587.

Teunissen, P.J.G., "The least-squares ambiguity decorrelation adjustment: its performance on short GPS baselines and short observation spans", Journal of Geodesy, (1997) 71: 589-602, 14 pages.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank, et al., "Precise Velocity Estimation Using a Stand-Alone GPS Receiver", Abstract only, Journal of the Institute of Navigation, vol. 51, No. 4, Winter 2004-2005, pp. 283-292, https://www.ion.org/publications/abstract.cfm?articleID=102384.

Verhagen, S., "The GNSS integer ambiguities: Estimation and validation", Aerospace Engineering, Jan. 31, 2005.

Wang, Yuechen, et al., "Real-time integrity monitoring for a wide area precise positioning system", Satell Navig (2020) 1:24.

Ward, D. D., et al., "The Uses and Abuses of ASIL Decomposition in ISO 26262", 7th IET International Conference on System Safety, incorporating the Cyber Security Conference 2012.

Waserman, Eyal, et al., "A Mixed Integer Least-Squares Formulation of the GNSS Snapshot Positioning Problem", https://github.com/eyalw711/snapshot-positioning, Jun. 2, 2021.

Watanabe, Yoko, et al., "Fault-tolerant final approach navigation for a fixed-wing UAV by using long-range stereo camera system", 2020 International Conference on Unmanned Aircraft Systems (ICUAS) Athens, Greece, Sep. 1-4, 2020.

Weiss, Berntrop K., et al., "GNSS Ambiguity Resolution by Adaptive Mixture Kalman Filter", TR2018-103, Jul. 13, 2018.

Wendel, J., et al., "Time-Differenced Carrier Phase Measurements for Tightly Coupled GPS/INS Integration", 0-7803-9454-2/06/$20.00/© 2006 IEE, Jul. 5, 2006, 2006 IEEE/ION Position, Location, and Navigation Symposium, Date of Conference: Apr. 25-27, 2006.

Won, Dachee, et al., "Performance Improvement of Inertial Navigation System by Using Magnetometer with Vehicle Dynamic Constraints", Hindawi, vol. 2015, published 2015, Article ID 435062, https://doi.org/10.1155/2015/435062, https://www.hindawi.com/journals/js/2015/435062/.

Wubbena, Gerhard, et al., "PPP-RTK: Precise Point Positioning Using State-Space Representation in RTK Networks", Presented at the 18th International Technical Meeting, ION GNSS-05, Sep. 13-16, 2005, Long Beach, California.

Wubbena, Gerhard, et al., "RTK Networks based on Geo++ GNSMART—Concepts, Implementation, Results", ION GPS 2001, Sep. 11-14, 2001, Salt Lake City, UT.

Xiao, Guorui, "A computationally efficient approach for isolating satellite phase fractional cycle biases based on Kalman filter", 19th EGU General Assembly, EGU2017, proceedings for the conference held Apr. 23-28, 2017 in Vienna., p. 12495.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Yang, Y., "L 1 Backup Navigation for Dual Frequency GPS Receive", Proceedings of the 16th International Technical Meeting of the Satellite Division of the Institute of Navigation (ION GPS/GNSS 2003), p. 1258-1263 (Year: 2003).

Yang, Y., et al., "L1 Backup Navigation for Dual Frequency GPS Receiver", Proceedings of the 16th International Technical Meeting of the Satellite Division of the Institute of Navigation (ION GPS/GNSS 2003), Portland, OR, Sep. 2003, pp. 1258-1263.

Zair, Salim, et al., "Outlier Detection in GNSS Pseudo-Range/Doppler Measurements for Robust Localization", Sensors 2016, 16, 580; doi:10.3390/s16040580, www.mdpi.com/journal/sensors.

Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.

Karaim, Malek, et al., "GPS Cycle Slip Detection and Correction at Measurement Level", British Journal of Applied Science & Technology 4(29): 4239-4251, 2014.

Khanafseh, Samer, et al., "GNSS Multipath Error Modeling for Automotive Applications", Abstract only, Proceedings of the 31st International Technical Meeting of the Satellite Division of the Institute of Navigation (ION GNSS+ 2018), Miami, Florida, Sep. 2018, pp. 1573-1589, https://www.ion.org/publications/abstract.cfm?articleID=16107.

Kilic, Cagri, et al., "ZUPT Aided GNSS Factor Graph with Inertial Navigation Integration for Wheeled Robots", Proceedings of the 34th International Technical Meeting of the Satellite Division of the Institute of Navigation (ION GNSS+ 2021) Sep. 20-24, 2021.

Kim, Jungbeom, et al., "A Low-Cost High-Precision Vehicle Navigation System for Urban Environment Using Time Differenced Carrier Phase Measurements", Proceedings of the 2020 International Technical Meeting, 597 ION ITM 2020, San Diego, California, Jan. 21-24, 2020, https://doi.org/10.33012/2020.17164.

Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.

Ko, Jonathan, et al., "GP-UKF: Unscented kalman filters with Gaussian process prediction and observation models", Conference Paper, Dec. 2007, 10.1109/IROS.2007.4399284.

Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.

Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

Lei, Yu, et al., "Prediction of Navigation Satellite Clock Bias by Gaussian Process Regression", Lecture Notes in Electrical Engineering 342:411-423, Jan. 2015.

(56) References Cited

OTHER PUBLICATIONS

Li, T., et al., "Some remarks on GNSS integer ambiguity validation methods", Survey Review, Dec. 5, 2012, vol. 44, No. 326.

Lim, Cheol-Soon, et al., "Feasibility Study on Integration of SSR Correction into Network RTK to Provide More Robust Service", JPNT 7(4), 295-305 (2018).

Lin, Ming, et al., "Robust Gaussian Process Regression for Real-Time High Precision GPS Signal Enhancement", Applied Data Science Track Paper. KDD '19, Aug. 4-8, 2019, Anchorage, AK, USA (Year: 2019).

Lin, Ming, et al., "Robust Gaussian Process Regression for Real-Time High Precision GPS Signal Enhancement", www.gps.gov/systems/gps/performance/accuracy, Jun. 5, 2019.

Liu, Haiying, et al., "A closed-loop EKF and multi-failure diagnosis approach for cooperative GNSS positioning", Engineering, GPS Solutions, Published 2015.

Madani, Kurosh, et al., "Studies in Computational Intelligence", Revised and Selected Papers of the International Joint Conference, IJCCI 2011, Paris, France, Oct. 24-26, 2011.

Madrid, Navarro, et al., "New Approach for Integrity Bounds Computation Applied to Advanced Precise Positioning Applications", Proceedings of the 28th International Technical Meeting of the Satellite Division of the Institute of Navigation (ION GNSS+ 2015) Sep. 14-18, 2015, Tampa Convention Center, Tampa, Florida.

Maybeck, Peter S., "Stochastic models, estimation, and control", vol. 1, Academic Press, p. 1-16, 133-134, 169-176, 203-220, 275-276, 289-306, 341-362, 411-423 (Year: 1979).

Meng, Xiaoli, et al., "A Robust Vehicle Localization Approach Based on GNSS/IMU/DMI/LiDAR Sensor Fusion for Autonomous Vehicles", Sensors, 2017, 17, 2140.

Mobarak, Jason, et al., "System and Method for GNSS Correction Transmission", U.S. Appl. No. 18/244,567, filed Sep. 11, 2023.

Nathan, Aaron, "Point One Navigation Launches ASIL Positioning Engine to Enable Safe and Precise Autonomous Vehicles", Point One Navigation, Dec. 19, 2022, https://pointonenav.com/news/point-one-navigation-launches-asil-positioning-engine/.

Odijk, Dennis, et al., "On the estimability of parameters in undifferenced, uncombined GNSS network and PPP-RTK user models by means of S-system theory", Journal of Geodesy, Nov. 2015.

Ogaja, Clement A., "Applied GPS for Engineers and Project Managers", ASCE Press, p. 177-179 (Year: 2011).

Parkins, Alexander James, "Performance of precise marine positioning using future modernised global satellite positioning systems and a novel partial ambiguity resolution technique Department of Civil", Environmental and Geomatic Engineering, Aug. 2009.

Parkins, Alex, et al., "System and Method for GNSS Correction Monitoring", U.S. Appl. No. 18/503,662, filed Nov. 7, 2023.

Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.

Pervan, Boris, et al., "Shaping Aviation Integrity Two RAIMs for Safety", GPS World the Business and Technology of Global Navigation and Positioning, Apr. 1, 2008.

Petovello, Mark, "How does a GNSS receiver estimate velocity?", Inside GNSS, Mar./Apr. 2015, www.insidegnss.com.

Phelts, R. Eric, et al., "Innovation: Improving ARAIM, An approach using precise point positioning", GPS World, Jun. 13, 2020, https://www.gpsworld.com/innovation-improving-araim/.

Pongsakornsathien, Nichakorn, et al., "A Performance-Based Airspace Model for Unmanned Aircraft Systems Traffic Management", Aerospace, vol. 7(154), 26 pages (Year: 2020).

Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Quinonero-Candel, Joaquin, et al., "A Unifying View of Sparse Approximate Gaussian Progress Regression", Journal of Machine Learning Research 6 (2005) 1939-1959. (Year: 2005).

Rasmussen, C.E., et al., "Gaussian Processes for Machine Learning", MIT Press, 2006, ISBN 026218253X. c 2006 Massachusetts Institute of Technology, (Year: 2006).

Reimer, Christian, et al., "System and Method for Fusing Sensor and Satellite Measurements for Positioning Determination", U.S. Appl. No. 18/115,963, filed Mar. 1, 2023.

Richardson, Julian, "Flexible Generation of Kalman Filter Code", NASA Technical Reports Server (NTRS), Document ID 20060019115, Jan. 1, 2006.

Rodriguez-Solano, Carlos, et al., "Protection Level of the Trimble RTX Positioning Engine for Autonomous Applications", Proceedings of the 34th International Technical Meeting of the Satellite Division of the Institute of Navigation (ION GNSS+ 2021), Sep. 20-24, 2021.

Rothacher, M., et al., "ANTEX: The Antenna Exchange Format, Version 1.4", Sep. 15, 2010, IGC International GNSS Service, https://kb.igs.org/hc/en-us/articles/216104678-ANTEX-format-description.

Roysdon, Paul F., et al., "GPS-INS Outlier Detection & Elimination using a Sliding Window Filter", 2017 American Control Conference (ACC), May 24-26, 2017, Seattle, WA, USA.

Satirapod, Chalermchon, "Improving the GPS Data Processing Algorithm for Precise Static Relative Positioning", School of Surveying and Spatial Information Systems the University of New South Wales. Jan. 2002.

Schmid, R., et al., "Estimation of elevation-dependent satellite antenna phase center variations of GPS satellites", Journal of Geodesy (2003) 77: 440-446, May 19, 2003, DOI 10.1007/s00190-003-0339-0.

Schmid, Ralf, et al., "From Relative Absolute Antenna Phase Center Corrections", Conference: IGS Workshop and Symposium 2004.

Schmid, Ralf, "How to Use IGS Antenna Phase Center Corrections", GPS World Tech Talk, Feb. 3, 2010.

Schmitz, Martin, "RTCM State Space Representation Messages, Status and Plans", PPP-RTK & Open Standards Symposium, Mar. 12-13, 2012, Frankfurt, Germany.

Shapiro, Larry S., et al., "Rejecting Outliers and Estimating Errors in an Orthogonal-Regression Framework", Phil. Trans. R. Soc. Load. A (1995)350, 407-439. (Year: 1995).

Skog, Isaac, et al., "A Low-Cost GPS Aided Inertial Navigation System for Vehicle Applications", 2005 13th European Signal Processing Conference, Sep. 4-8, 2005.

Sleewaegen, Jean-Marie, et al., "Galileo E5b Rover Receiving E5a Corrections? No Problem!", 32nd International Technical Meeting of the Satellite Division of the Institute of Navigation (ION GNSS+ 2019), Miami, Florida, Sep. 16-20, 2019.

Smolyakov, Ivan, et al., "System and Method for Determining GNSS Corrections", U.S. Appl. No. 18/241,542, filed Sep. 1, 2023.

Snelson, Edward, et al., "Sparse Gaussian Process using Pseudo-inputs", NIPS'05: Proceedings of the 18th International Conference on Neural Information Processing Systems, Dec. 2005, pp. 1257-1264.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Subirana, J. S., "Combination of GNSS Measurements, Navipedia", https://gssc.esa.int/navipedia/index.php?title=Combination_of_GNSS_Measurements (Year: 2011).

Takasu, Tomoji, et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

International Search Report and Written Opinion for PCT Application No. PCT/US20/44750 mailed Jan. 8, 2021.

International Search Report and Written Opinion for PCT Application No. PCT/US20/31137 mailed Sep. 4, 2020.

"An Introduction to GNSS, Chapter 4, GNSS Error Sources", https://novatel.com/an-introduction-to-gnss/chapter-4-gnsserror-sources, published 2015.

(56) References Cited

OTHER PUBLICATIONS

"Geo++ SSR for Network-RTK, PPP and PPP-RTK", https://geopp.de/wp-content/uploads/2020/09/SSR_Flyer_v3.pdf, Sep. 2015.

"IGS State Space Representation (SSR) Format Version 1.00", International GNSS Service (IGS), Oct. 5, 2020.

"Integrity—Navipedia", https://gssc.esa.int/navipedia/index.php/Integrity, published 2011.

"NAVSTAR GPS Space Segment/Navigation User Segment Interfaces", IS-GPS-200L, 228 pages (Year: 2020), May 14, 2020.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

"RAIM", GMV, 2011, RAIM.

"Road vehicles Functional safety Part 1: Vocabulary", ISO 26262-1:2018, https://www.iso.org/standard/68383.html, Abstract, published Dec. 2018.

"Safe Position Augmentation for Real-Time Navigation (SPARTN) Interface Control Document Version 1.8.0", Jan. 2020, Sapcorda Services GmbH.

"Swift Navigation Binary Protocol", Version 3.4.5, Mar. 10, 2021, pp. 1-156.

"The First in China | Bynav Alice GNSS SOC Awarded ISO 26262 ASIL B Functional Safety Product Certification", Gasgoo, https://autonews.gasgoo.com/m/70028360.html, Sep. 22, 2023.

"Wikipedia (Covariance matrix)", https://en.wikipedia.org/wiki/Covariance_matrix, downloaded May 2, 2023 (Year: 2023).

Abdel-Hafez, M. F., "A High-Integrity and Efficient GPS Integer Ambiguity Resolution Method", Navigation: Journal of the Institute of Navigation, vol. 50(4), p. 295-310, Winter 2003-2004 (Year: 2004).

Altmayer, Christian , "Cycle Slip Detection and Correction by Means of Integrated Systems", ION Institute of Navigation, Proceedings of the 200 National Technical Meeting of the Institute of Navigation, Abstract, Jan. 26-28, 2000.

Angelo, Joseph , et al., "System and Method for Detecting Outliers in GNSS Obervations", U.S. Appl. No. 18/116,117, filed Mar. 1, 2023.

Berntorp, Karl , et al., "Bayesian Sensor Fusion of GNSS and Camera With Outlier Adaptation for Vehicle Positioning", Mitsubishi Electric Research Laboratories, https://www.merl.com, Aug. 6, 2022.

Bijl, Hildo , et al., "Online sparse Gaussian process regression using FITC and PITC approximations", IFAG—Papers on Line vol. 48, Issue 28, 2015, pp. 703-708 (Year: 2015).

Blanch, Juan , et al., "RAIM with Optimal Integrity and Continuity Allocations Under Multiple Failures", IEEE Transactions on Aerospace and Electronic Systems, vol. 46, No. 3, Jul. 2010.

Boda, Aaron , "Cycle Slip Detection using PVA Kalman Filter", Technical Report ■ Dec. 2017.

Brack, A. , "Optimal Estimation of a Subset of Integers With Application to GNSS", Artificial Satellites, vol. 51, No. 4—2016 DOI: 10.1515/arsa-2016-0011.

Brocard, Philippe , "Integrity monitoring for mobile users in urban environment", https://tel.archives-ouvertes.fr/tel-01379632/document, submitted Oct. 11, 2016.

Brocard, Philippe , et al., "System and Method for Bounding a Satellite Positioning Solution Integrity", U.S. Appl. No. 18/537,212, filed Dec. 12, 2023.

Brocard, Philippe , et al., "System and Method for Distributed Integrity Monitoring", U.S. Appl. No. 18/491,167, filed Oct. 20, 2023.

Bruno, Jon , et al., "A realistic simulation framework to evaluate ionospheric tomography", Advances in Space Research 65 (2020) 891-901.

Cassel, Ryan , "Real-Time ARAIM Using GPS, GLONASS, and Galileo", Submitted in partial fulfillment of the requirements for the degree of Master of Science in Mechanical and Aerospace Engineering in the Graduate College of the Illinois Institute of Technology, May 2017.

Chen, Liang , et al., "GNSS High-Precision Augmentation for Autonomous Vehicles: Requirements, Solution, and Technical Challenges", Remote Sens. 2023,15,1623. https://doi.org/ 10.3390/rs15061623.

Chiu, David S. , et al., "Bierman-Thornton UD Filtering for Double-Differenced Carrier Phase Estimation Accounting for Full Mathematical Correlation", Jan. 2008, ION NTM 2008, pp. 756-762., Jun. 23, 2017 00:00:00.0.

Cole, D.A. , et al., "Locally induced Gaussian processes for large-scale simulation experiments", Stat Comput 31, 33 (2021). https://doi.org/10.1007/s11222-021-10007-9 (Year: 2021).

Collin, Jussi , et al., "TKT-2546 Methods for Positioning", Tampere University of Technology, 2010, 50 pages.

Davidson, Pavel , et al., "Improved Vehicle Positioning in Urban Environment through Integration of GPS and Low-Cost Inertial Sensors", European Navigation Conference, ENC-GNSSAt: Naples, Italy, May 2009.

Ding, Wei , et al., "Carrier Phase-Based Precise Heading and Pitch Estimation Using a Low-Cost GNSS Receiver", Remote Sens. 2021,13,3642. https://doi.org/ 10.3390/rs13183642.

Drescher, Ralf , "Fast convergence of Trimble CenterPoint RTX by regional augmentation", Trimble Terrasat GmbJ, Munich, EGU General Assembly 2015, Vienna, Thursday, Apr. 16, 2015.

Erickson, Collin B., et al., "Comparison of Gaussian Process Modeling Software", European Journal of Operational Research 266 (2018) 179-192 (Year: 2018).

Farrell, James L., "Carrier Phase Processing Without Integers", ION 57th Annual Meeting/CIGTF 20th Biennial Guidance Test Symposium, Jun. 11-13, 2001, Albuquerque, NM.

Favey, Etienne , et al., "Dead reckoning fills-in GPS navigation gap", EE Times, Automotive Designline, Aug. 18, 2011.

Feng, Shaun , et al., "Carrier phase-based integrity monitoring for high-accuracy positioning", GPS Solution, Apr. 2009.

Freda, Peirluigi , et al., "Time-differenced carrier phases technique for precise GNSS velocity estimation", GPS Solut, DOI 10.1007/s10291-014-0425-1, published online Dec. 31, 2014.

Gargiulo, Gianluca , et al., "GNSS Integrity and protection level computation for vehicular applications", Conference: Proceedings of 16th Ka and broadband communications—navigation and earth observation conference, Jan. 2010, https://www.researchgate.net/publication/239949398_GNSS_Integrity_and_protection_level_computation_for_vehicular_applications.

Geng, Jianghui , et al., "Toward global instantaneous decimeter-level positioning using tightly coupled multi-constellation andmulti-frequency GNSS", Journal of Geodesy, vol. 92, p. 977-991 (Year: 2019).

George, Jitin , "C2000 MCU SafeTI control solutions: An introduction to ASIL decomposition and SIL synthesis", Texas Instruments, Apr. 2019.

Gratton, Livio , et al., "Carrier Phase Relative RAIM Algorithms and Protection Level Derivation", Journal of Navigation (2010), 63, 215-231, doi: 10.1017/S0373463309990403.

Gunning, Kazuma , et al., "Design and evaluation of integrity algorithms for PPP in kinematic applications", Proceedings of the 31st International Technical Meeting of the Satellite Division of the Institute of Navigation (ION GNSS+ 2018) Sep. 24-28, 2018, Hyatt Regency Miami, Miami, Florida.

Henkel, Patrick , et al., "Joint L-/C-Band Code and Carrier Phase Linear Combinations for Galileo", International Journal of Navigation and Observation, vol. 2008, Article ID 651437, 8 pages.

Hirokawa, Dr. Rui , "Recent Activity of International Standardization for High-Accuracy GNSS Correction Service", Mitsubishi Electric, Jun. 27, 2019.

Huang, Panpan , "Airborne GNSS PPP Based Pseudolite System", School of Civil and Environmental Engineering Faculty of Engineering UNSW. Jun. 2019.

Ibrahim, Hassan E., et al., "A Regional Stochastic Model for NOAA-Based Residual Tropospheric Delay", ION NTM 2008, Jan. 28-30, 2008, San Diego, CA.

Inyurt, Samed , et al., "Ionospheric TEC Forecasting Using Gaussian Process Regression (GPR) and multiple Linear Regression (M LR) in X Turkey", Astrophys Space Sci (2020) 365:99, https://doi.org/10.1007 / s10509-020-03817-2 (Year: 2020).

(56) References Cited

OTHER PUBLICATIONS

Karaim, Malek, et al., "GNSS Error Sources", https://www.intechopen.com/books/multifunctional-operation-and-application-of-gps/gnss-error-sources, published Apr. 6, 2018.

Wang, Min, et al., "GPS Un-Differenced Ambiguity Resolution and Validation", Proceedings of the 19th International Technical Meeting of the Satellite Division of the Institute of Navigation (ION GNSS 2006), p. 292-300 (Year: 2006).

Kim, Donguk, et al., "Modified Kriging Based Double-Difference Tropospheric Correction Interpolation Method for Network RTK User", Proceedings of the 30th International Technical Meeting of the Satellite Division of The Institute of Navigation (ION GNSS+ 2017), Sep. 25-29, 2017, Oregon Convention Center. Portland, Oregon.

Li, Yihe, et al., "Improved PPP Ambiguity Resolution Considering the Stochastic Characteristics of Atmospheric Corrections from Regional Networks", Sensors 2015, 15, 29893-29909; doi:10.3390/s151229772, www.mdpi.com/journal/sensors, published Nov. 30, 2025.

Li, Xingxing, et al., "Real-time precise point positioning regional augmentation for large GPS reference networks", GPS Solut (2014) 18:61-71, published Jan. 24, 2013.

Sparks, Lawrence, et al., "Estimating ionospheric delay using kriging", Radio Science, vol. 46, RS0D21, doi:10.1029/2011RS004667, 2011, published Oct. 27, 2011.

Yang, Lei, et al., "Numerical weather modeling-based slant tropospheric delay estimation and its enhancement by GNSS data", Geo-spatial Information Science, 2013, vol. 16, No. 3, 186-200, http://dx.doi.org/10.1080/10095020.2013.817107, published Aug. 13, 2013.

\* cited by examiner

SYSTEM AND METHOD FOR CORRECTING SATELLITE OBSERVATIONS

CROSS-REFERENCE TO RELATED APPLICATIONS

This application is a divisional of U.S. patent application Ser. No. 18/079,640 filed 12 Dec. 2022, which claims the benefit of U.S. Provisional Application No. 63/288,381, filed 10 Dec. 2021, each of which is incorporated in its entirety by this reference.

TECHNICAL FIELD

This invention relates generally to the satellite positioning field, and more specifically to a new and useful system and method in the satellite positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
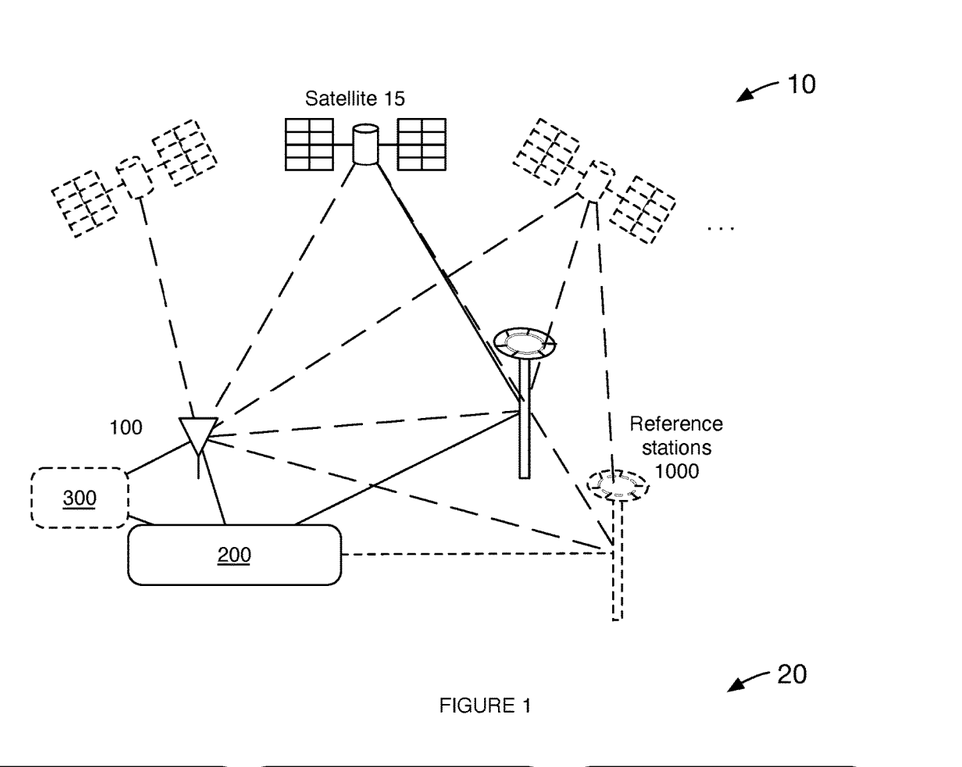
FIG. 1 is a schematic representation of the system.

As shown in FIG. 1, the system 10 can include a GNSS receiver 100, a base station 1000 (e.g., reference station), and a computing system 200. The system can optionally include one or more data sources (e.g., satellite 15, sensor 300, etc.), an external system, and/or any suitable components.

Figure 2:
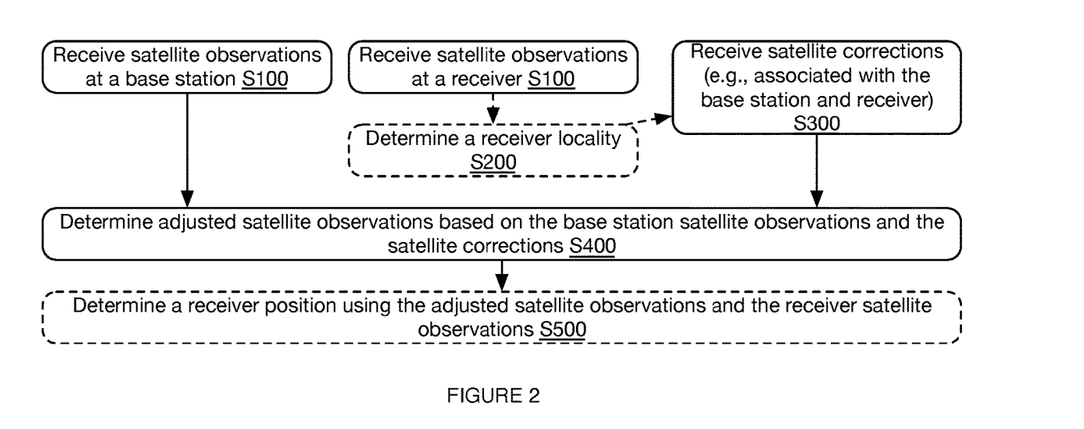
FIG. 2 is a schematic representation of the method.

As shown in FIG. 2, the method 20 can include receiving satellite observations S100, receiving satellite corrections S200, and determining adjusted satellite observations S300 (e.g., determining satellite observations associated with a virtual reference station). The method can optionally include: determining a GNSS receiver locality S150, determining a GNSS receiver position S400, and/or any suitable steps.

The system and/or method preferably function to determine a position of a GNSS receiver, determine corrections (e.g., to facilitate or improve GNSS positioning solution determination), and/or can otherwise function. Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system, wherein the system can use the data for control and/or navigation.

2. Benefits

Variations of the technology can confer several benefits and/or advantages.

Figure 4:
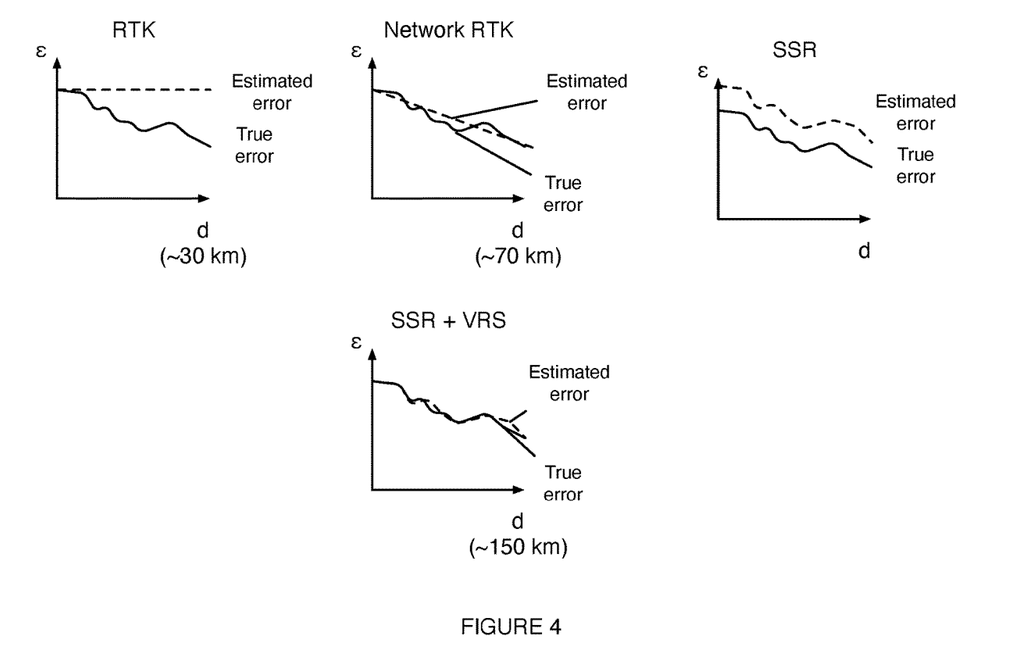
FIG. 4 is a schematic representation of an example of error estimation for an RTK, a network RTK, an SSR, and an SSR with virtual reference stations systems.

First, variants of the technology can enable high accuracy (e.g., mm-, cm-, dm-, m-, level etc. such as 1 mm, 2 mm, 5 mm, 1 cm, 2 cm, 5 cm, 1 dm, 2 dm, 5 dm, 1 m, etc.) GNSS positioning solutions to be determined at large distances from base stations. For example (as shown for instance in FIG. 4), solutions using real-time kinematic approaches can have high accuracy when the distance between the base station and the GNSS receiver is at most about 30-70 km. Examples of the technology can enable high accuracy positioning solutions to be determined when the distance between the base station and the GNSS receiver is 140-200 km (or even larger baselines as well as accommodating smaller baselines). For instance, combining SSR corrections (e.g., state space representation corrections) with OSR-type corrections (e.g., observation space representation corrections) can enable these larger baselines (e.g., where at shorter distances the positioning solutions can be improved for instance by the reference station information).

Second, variants of the technology can enable higher positioning accuracy for GNSS positioning solutions operating using SSR corrections, particularly but not exclusively near (e.g., proximal; within a threshold distance of; at most about 1 km, 5 km, 10 km, 20 km, 30 km, 50 km, 75 km, 100 km, etc. from; etc.) a base station. For instance, combining SSR corrections (e.g., state space representation corrections) with OSR-type corrections (e.g., observation space representation corrections) can enable higher accuracy solutions near a base station (e.g., approaching the accuracy of using the base station observations directly).

However, variants of the technology can confer any other suitable benefits and/or advantages.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

3. System.

As shown in FIG. 1, the system 10 can include a GNSS receiver 100, a base station woo (also referred to as a reference station), and a computing system 200. The system can optionally include one or more data sources (e.g., satellite 15, sensor 300, etc.), an external system, and/or any suitable components. The system preferably functions to determine the position of a GNSS receiver and/or external system, determine corrections to satellite observations (e.g., detected by the GNSS receiver), and/or can otherwise function.

The system preferably uses a set of data collected by one or more data sources. Data sources can include: GNSS receivers 100, sensors 300 (e.g., located onboard the GNSS receiver, the external system, a reference station, etc.), databases, base stations woo (e.g., reference stations), satellites 15, and/or any other suitable data source. Examples of data that can be used include: satellite observations (e.g., satellite code, carrier phase, Doppler, etc.; derived information such as pseudorange; etc.), sensor data, and/or any other suitable data.

The GNSS receiver preferably functions to receive a set of satellite observations (e.g., satellite signals) from one or more satellites. In variants, the GNSS receiver (or a processor thereof) can determine the location (e.g., by using pseudoranges, by using carrier phase) of the GNSS receiver (e.g., the GNSS receiver antenna, the external system, etc.) based on the satellite observations. The GNSS receiver is preferably in communication with the computing system. However, the GNSS receiver can be integrated with the computing system, and/or the GNSS receiver and computing system can be arranged in any suitable manner. The GNSS receiver can be a stand-alone device (e.g., including an antenna), integrated into the external system (e.g., be a component of an automobile, aero vehicle, nautical vehicle, etc.), can be a user device (e.g., smart phone, laptop, cell phone, smart watch, etc.), and/or can be configured in any suitable manner.

A GNSS receiver 100 can be configured to receive satellite observations associated with one or more satellite constellations, one or more carrier frequencies (e.g., the L1, L2, L5, E1, E5a, E5b, Eab, E6, G1, G3, B1, B2, B3, LEX, etc. frequencies), and/or any suitable data. For example, the GNSS receiver can be a single frequency receiver (e.g., track a single satellite frequency), a multi-frequency receiver (e.g., receive and/or track satellite signals with more than one frequency, include two or more antennas, etc.), and/or any suitable receiver.

The base station(s) 1000 preferably function to receive satellite observations which can be used to correct satellite observations made at the GNSS receiver (e.g., mobile receiver). The base station satellite observations can be used to difference (e.g., form combinations with) the GNSS receiver observations, to model corrections (e.g., used by a corrections generator to generate a model of the GNSS corrections), and/or can otherwise be used. The base stations are typically within a threshold distance of the GNSS receiver (e.g., within 10 km, 20 km, 50 km, 100 km, 150 km, 300 km, etc.), but can be further than the threshold distance from the GNSS receiver. The base stations are preferably distributed such that for a given geographical region (e.g., city, county, province, state, country, continent, etc.) a GNSS receiver is within the threshold distance of at least one base station. However, the base stations can otherwise be distributed or arranged (e.g., based on a probability of a GNSS receiver being within a given spatial area, based on a frequency of GNSS receivers in a given region, etc.). The base stations are preferably at substantially the same height relative to sea level (e.g., within about loom of the same height above sea level), but can have any suitable height(s) relative to each other and/or relative to the sea level.

The set of satellite observations (e.g., measured by the GNSS receiver, measured by the base station, etc.) can include orbital data, timestamp, range rate data, carrier phase data, pseudorange data, doppler data, and/or any suitable data. The set of satellite observations can be associated with metadata (e.g., ephemeris), and/or any suitable data. The set of satellite observations preferably includes satellite observations corresponding to satellites from more than one satellite constellation (e.g., Global Positioning System (GPS), GLObal Navigation Satellite System (GLONASS), BeiDou positioning System (BDS), Galileo, Navigation with Indian Constellation (NavIC), Quasi-Zenith Satellite System (QZSS), GPS Aided Geo Augmented Navigation (GAGAN), etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data. Each satellite observation from the set of satellite observations preferably corresponds to a common time window (e.g., epoch). However, each satellite observation can be associated with a timestamp (e.g., time of transmission, time of receipt, time of processing, etc.), and/or the satellite observations can have any suitable timing.

The optional sensor(s) 300 can function to measure sensor data (e.g., auxiliary data) associated with the external system (and/or the GNSS receiver). The sensor data can be used to determine (e.g., independent of the satellite observations) the external system location (e.g., fused with the GNSS positioning solution or satellite signals such as disclosed in U.S. patent application Ser. No. 17/860,779 titled 'SYSTEM AND METHOD FOR FUSING DEAD RECKONING AND GNSS DATA STREAMS' filed 8 Jul. 2022 which is incorporated in its entirety by this reference), but can additionally or alternatively be used to assist (e.g., speed-up, correct, refine, etc.) the calculation (e.g., calculating the state vector, estimating the phase ambiguity, converge or reconverge such as disclosed for example in U.S. patent application Ser. No. 17/686,588 titled 'SYSTEM AND METHOD FOR RECONVERGING GNSS POSITION ESTIMATES' filed 4 Mar. 2022 which is incorporated in its entirety by this reference, etc.) of position from the satellite observations and/or be otherwise used. The sensors are preferably in communication with the computing system.

The sensors can be: on-board the external system, on-board a separate external system, integrated into the GNSS receiver, separate from the GNSS receiver, and/or otherwise associated with the GNSS receiver.

The sensor data can include: inertial data (e.g., acceleration, angular velocity, angular acceleration, magnetic field, etc.), odometry, pose (e.g., position, orientation), mapping data (e.g., images, point clouds), temperature, pressure, ambient light, images (e.g., thermal images, optical images, etc.; landmarks, features, etc. associated with the images; etc.), video feeds, and/or any other suitable data. The sensors can include one or more of: inertial measurement unit (IMU), accelerometer, gyroscope, magnetometer, odometer (e.g., wheel speeds; wheel ticks; steering angles; visual odometers such as cameras; etc.), pressure sensors, distance measurement instrument, image sensor (e.g., camera, thermal camera, etc.), LIDAR, RADAR, SONAR, and/or any suitable sensor.

The system (e.g., an external system connected to the system, a base station, etc.) can include more than one GNSS receivers and/or sensors, which can function to provide redundancy, provide information in the event of an outage to one of the GNSS receivers or sensors, provide validation and/or cross checks between data sources (e.g., be used to monitor or detect the incoming data streams), and/or otherwise function. The relative pose between each GNSS receiver (e.g., between each GNSS receiver antenna), each sensor, and/or each GNSS receiver/sensor pair is preferably known, but can be unknown.

The computing system 200 preferably functions to process the data (e.g., satellite observations, base station observations, sensor data, etc.) received by the GNSS receiver(s), the base station(s), and/or the sensor(s). The computing system can: aggregate the data (e.g., combine the GNSS receiver satellite observations, base station satellite observations, satellite corrections, and/or sensor data; reorganize the GNSS receiver satellite observations, base station satellite observations, and/or sensor data such as based on the timestamp, time of transmission, time of receipt, etc.; etc.), filter the data (e.g., to calculate state vectors, ambiguities such as phase ambiguities, etc. associated with the data), calculate the GNSS receiver position (e.g., the GNSS phase center position), calculate an integrity of the solution (e.g., the protection level, the integrity risk, the total integrity risk, etc.), calculate the external system location, correct the data (e.g., correct the satellite observations for clock errors, hardware bias, atmospheric effects, etc.), and/or can process the data in any suitable manner. The computing system can be local (e.g., to the external system, to the GNSS receiver, to a base station, etc.), remote (e.g., cloud computing, server, networked, etc.), and/or otherwise distributed.

The computing system is preferably communicably coupled to the GNSS receiver and/or the base station(s), but can be communicably coupled to any suitable data sources. The computing system is preferably distributed between a local computing system that is colocalized with (e.g., integrated into) the GNSS receiver (and/or external system) and a remote computing system (e.g., a cloud computing server, remote computer bank, etc.). However, the computing system can be a remote computing system, a local computing system (e.g., collocated with the GNSS receiver, integrated in the external system, etc.), and/or can otherwise be distributed (e.g., between two or more separate servers).

The computing system can include (and/or be connected to) a corrections generator (e.g., a corrections service, corrections modelling engine, reliability engine, etc.), a monitor (e.g., corrections monitor, satellite signal monitor, metadata monitor, etc.), a VSR generator, and/or any suitable components.

The corrections generator functions to determine (e.g., model, filter, calculate, compute, estimate, etc.) the GNSS corrections. The corrections generator can generate corrections from reference station data (e.g., pseudorange and/or carrier phase from reference stations), global corrections data (e.g., satellite clock, satellite orbit, bias, etc.), and/or metadata (e.g., reference station positions, ocean tide loading, antenna type, receiver type, etc.), but may additionally or alternatively generate corrections using sensor data, satellite observations (e.g., as detected at a GNSS receiver), and/or any input data.

The GNSS corrections are preferably SSR (state space representation) corrections (e.g., error estimates separate error source(s)). However, the GNSS corrections can additionally or alternatively include be OSR (observation space representation) corrections (e.g., a lump sum of errors resulting from one or more error source such as satellite clock, satellite orbit, satellite signal bias, ionospheric delay, ionospheric advance, tropospheric delay, etc. such as provided as a range correction for a combination of satellites, frequencies, and/or signals), and/or can be any suitable correction representation.

The monitor can function to detect (and/or mitigate) one or more predetermined events in input data. In some variants, the monitor can additionally or alternatively determine an accuracy and/or integrity of the GNSS corrections (e.g., an accuracy or integrity that is achievable by a positioning engine ingesting the GNSS corrections). A monitor can, for instance, determine a residual (e.g., for one or more withheld data sources), monitor outliers in a data stream (e.g., using a hybrid, variance threshold technique, a scaled variance technique, etc. as disclosed in U.S. patent application Ser. No. 16/748,517 titled 'SYSTEMS AND METHODS FOR REDUCED-OUTLIER SATELLITE POSITIONING' filed 21 Jan. 2020 which is incorporated in its entirety by this reference), and/or can otherwise monitor any suitable data in any suitable manner.

For example, the corrections generator and/or monitor can operate in a manner similar to a corrections engine (and/or components thereof such as PPP filters, atmospheric modeler, correction generator, reference observation monitor, correction data monitor, metadata monitor, modeling engine, reliability engine, etc.) as disclosed in U.S. patent application Ser. No. 17/829,019 titled 'SYSTEMS AND METHODS FOR HIGH-INTEGRITY SATELLITE POSITIONING' filed 31 May 2022 which is incorporated in its entirety by this reference. In another (related and/or combinable with the preceding example) example, a corrections generator can generate corrections (e.g., SSR corrections) using a Gaussian model (for instance in a manner as disclosed in U.S. patent application Ser. No. 17/554,397 titled 'SYSTEM AND METHOD FOR GAUSSIAN PROCESS ENHANCED GNSS CORRECTIONS GENERATION' filed 17 Dec. 2021 which in incorporated in its entirety by this reference) to process reference station satellite observations to estimate the corrections.

The VSR generator can function to determine a virtual reference station (VRS) location and/or to determine an observation at the VRS location (e.g., an observation, range, etc. such as would be observed by a reference station, base station, GNSS receiver, etc. at the VRS location).

The VRS location is preferably determined based on a GNSS receiver locality (e.g., received from a GNSS receiver). For instance, the VRS location can be set to a nearest grid point (e.g., grid point as disclosed in U.S. patent application Ser. No. 17/833,560 titled 'SYSTEM AND METHOD FOR DETERMINING GNSS POSITIONING CORRECTIONS' filed 6 Jun. 2022 which is incorporated in its entirety by this reference), nearest feature, to the approximate location of the GNSS receiver (e.g., mean position, computed locality regardless of exact position, etc.), to a predetermined VRS position located within a threshold distance of the GNSS receiver (e.g., where a grid of VRS positions can exist that cover a geographic area such that any GNSS receiver within the geographic area is at most a threshold distance from a VRS position), and/or can be determined in any manner.

The VRS location 1050 is preferably at most a threshold distance from the GNSS receiver position (and/or locality). The threshold distance is preferably at most about 10 km (e.g., 0.5 km, 1 km, 2 km, 5 km, 7 km, 10 km, 10.5 km, values or ranges therebetween). However, the threshold distance can additionally or alternatively be greater than 10 km (e.g., 15 km, 20 km, 25 km, 5o km, 100 km, etc.). The threshold distance can be fixed (e.g., constant) and/or variable (e.g., depending on a target positioning accuracy, depending on potential error sources, depending on a multipath environment proximal the GNSS receiver, depending on a multipath environment proximal the VRS position, etc.).

Figure 6:
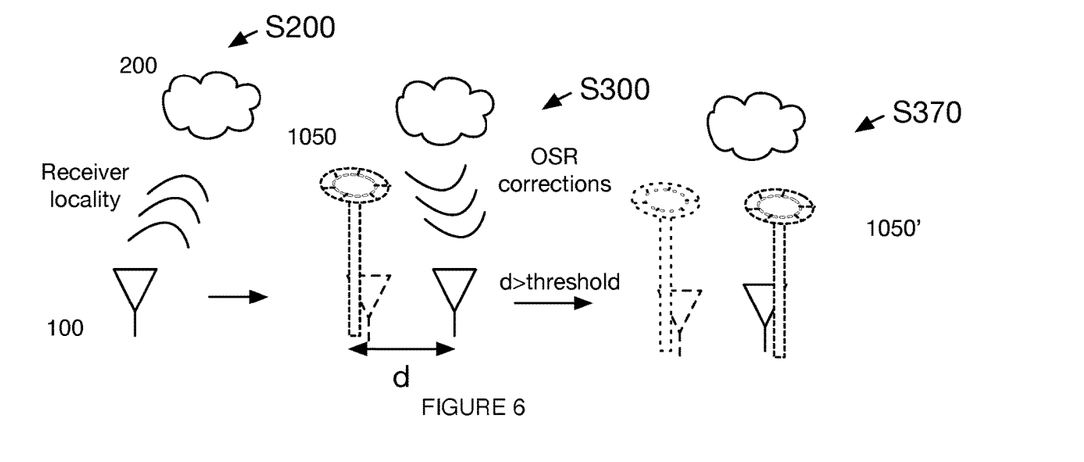
FIG. 6 is a schematic representation of an example of setting a virtual reference station and updating a virtual reference station.

When the threshold distance is exceeded, the VRS generator can update the VRS location (e.g., determine a new VRS location 1050', as shown for example in FIG. 6), the VRS observation can be flagged (e.g., as invalid, as below a target accuracy, as below a target integrity, etc.), and/or the VRS generator can otherwise response. The VRS location can be updated in the same and/or a different manner from the VRS location generation. As an illustrative example, when the VRS location exceeds a threshold distance, an updated VRS location can be the GNSS receiver (and/or external system) position (and/or locality) when the threshold distance is exceeded. In some variants of this illustrative example, the VRS location can be updated when the GNSS receiver position is near the threshold distance (e.g., a new VRS location can be determined when the GNSS receiver is about 1 km, 500 m, 250 m, 100 m, 50 m, 10 m, etc. of the threshold distance which can be beneficial to avoid needing to reset a server or calculation or operate during a period of time without a valid VRS observation).

The VRS generator preferably determines the VRS observation by combining the GNSS corrections (e.g., generated by the corrections generator) with reference station observations (e.g., satellite observations measured, tracked, received, etc. at one or more reference stations proximal the VRS location). However, the VRS observation can otherwise be generated.

Figure 8A:
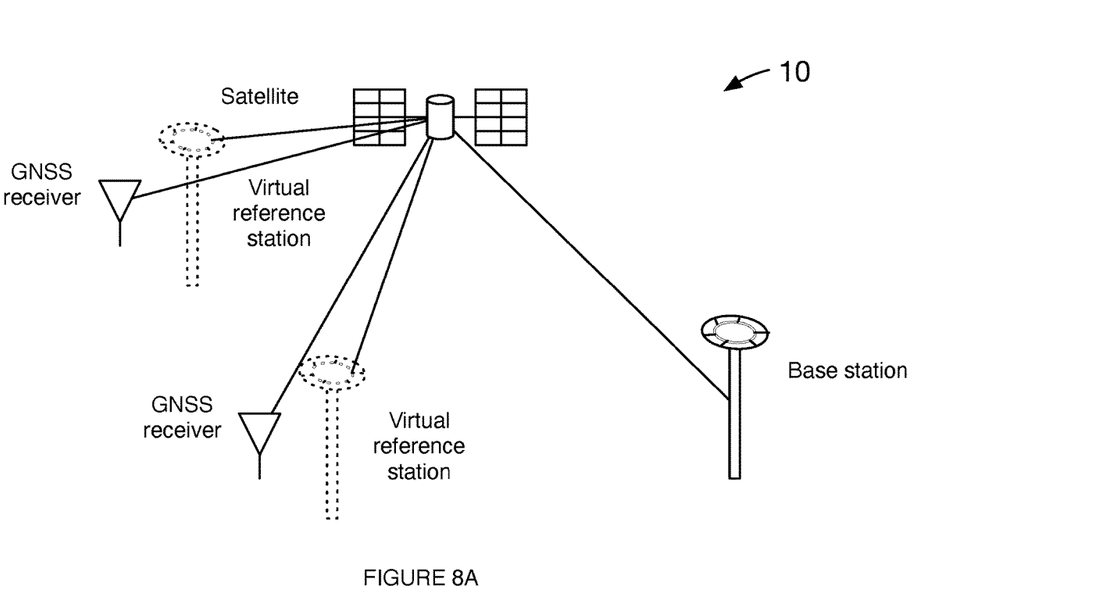
FIGS. 8A and 8B are schematic representations of examples of virtual reference stations when two or more GNSS receivers are used in a common location.
Figure 8B:
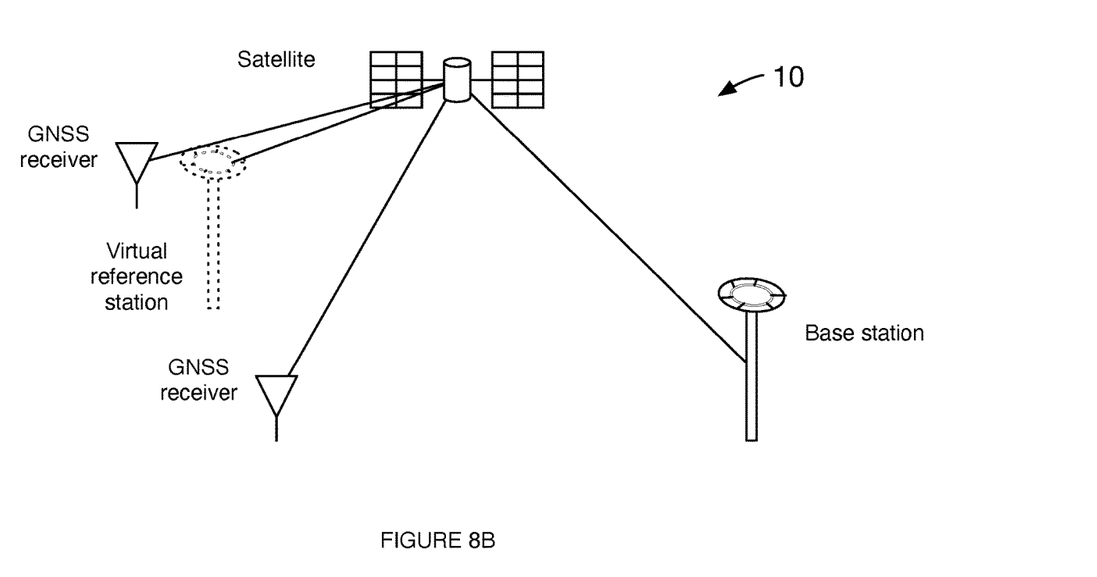

A VRS (e.g., VRS location) can be associated with (e.g., used by) a single GNSS receiver (as shown for example in FIG. 8A), a plurality of GNSS receivers (as shown for example in FIG. 8B), and/or in any suitable manner. In some variants, a plurality of VRSs can be used by one or more GNSS receivers (e.g., in a manner analogous to network RTK-corrections generations using the plurality of VRS to generate a secondary VRS).

4. Method

The method 20 preferably functions to determine (e.g., select, route, etc.) virtual reference station observations (which can be used as GNSS corrections to correct satellite signals or observations received by a GNSS receiver), transmit VRS observations (e.g., to a GNSS receiver, positioning engine, etc. to be used as a GNSS correction), and/or estimate (e.g., calculate, determine) a receiver position (e.g., by leveraging or using the GNSS corrections). Steps and/or substeps of the method can be performed iteratively (e.g., for different epochs, for the same epoch, etc.), sequentially, and/or in any suitable order. The steps and/or substeps of the method can be performed in series and/or in parallel. The steps and/or substeps are preferably performed by a system as described above, but can be performed by any system.

Receiving the satellite observations S100 functions to measure and/or detect a set of satellite signals, where each satellite signal is associated with a satellite. The satellite observations can be received at a base station, a GNSS receiver, a computing system (e.g., where satellite observations can be stored and/or retrieved from a database), and/or at any suitable endpoint. In a preferred embodiment, satellite signals associated with (e.g., from) a first set of satellites are received by a GNSS receiver and satellite signals associated with (e.g., from) a second set of satellites are received by a base station. The first and the second set of satellites can be the same, the first set of satellites can be a strict subset of the second set of satellites, the second set of satellites can be a strict subset of the first set of satellites, the first set of satellites can include one or more satellites that are in second set of satellites and one or more satellites that are not in the second set of satellites, and/or the first and second set of satellites can include any suitable satellites and/or relationships between satellites. Satellite signals are preferably received for a common epoch, but can be received for any suitable epoch or relative time.

Determining the receiver locality S200 preferably functions to determine an approximate receiver location. The receiver locality is preferably within about 100 km (e.g., within or less than 1 m, 5 m, 10 m, 50 m, 100 m, 500 m, 1 km, 10 km, 100 km, etc.) of the actual receiver position, but can be greater than 100 km from the actual receiver position. The receiver locality can be: coordinates, a tile identifier, a grid point identifier (and/or nearest grid point), a cell site (and/or other information transfer site), or other identifier. The receiver locality can be determined by the GNSS receiver, a computing system (e.g., a local computing system, a remote computing system, etc.), and/or by any component. Determining the receiver locality can additionally or alternatively include determining the receiver kinematics (such as receiver velocity, receiver attitude, etc.) where the receiver kinematics can be used in addition to or alternatively to the receiver locality and/or any suitable steps.

The receiver locality can be determined from (or based on) a nearest cellular tower, cellular tower trilateration, a WIFI signal, the last known receiver position (e.g., a stored receiver position, a receiver position prior to an outage, etc.), a satellite connection (e.g., satellite network), computer vision (e.g., to identify objects, features, etc. in the environment of the receiver), user input, base station signal (e.g., a nearest base station), a transponder signal, a previous receiver position (e.g., determined from a previous iteration of the method, receiver position calculated from the satellite observations without convergence, receiver position calculated from the satellite observations without validation, receiver position calculated from the satellite observations such as using pseudorange to calculate an approximate receiver location, receiver position determined prior to an outage, receiver position determined without integer fixing a carrier phase ambiguity, receiver position determined using satellite signals without correction, etc.), receiver position estimated based on or using inertial navigation (e.g., dead reckoning), receiver position estimated based on or using pilotage, receiver position estimated based on or using celestial navigation, receiver position estimated based on or using radio navigation (e.g., LORAN-C, Omega, Tacan, US Army Position Location and Reporting System, etc.), and/or can be otherwise determined.

Figure 5:
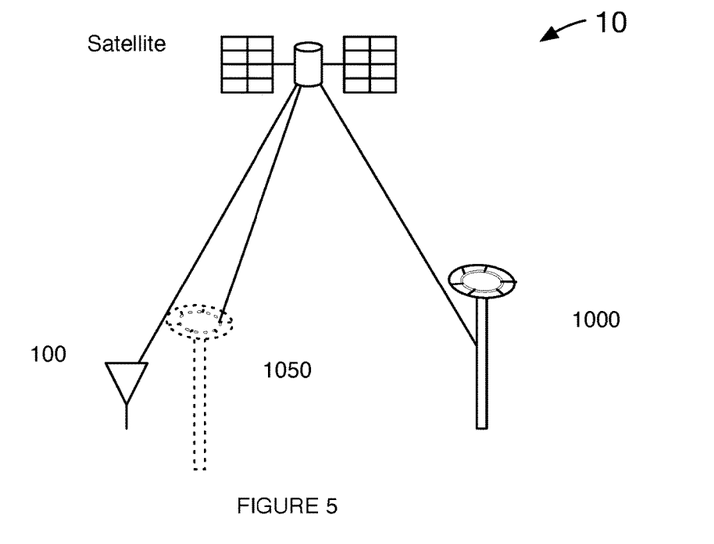
FIG. 5 is a schematic representation of an example geometry for a GNSS receiver, virtual reference station, and base station.

In some embodiments, the receiver locality can be used to determine a virtual reference station (VRS) position. For instance, the VRS position can be coincident with the receiver locality (e.g., the same as; within a threshold distance such as 1 m, 5 m, 10 m, 20 m, 50 m, 100 m, 200 m, 500 m, etc. of; at a centroid of an estimated receiver locality; etc.). However, the VRS position can additionally or alternatively be determined based on nearby reference stations (e.g., be at a centroid between nearby reference stations, be at a centroid of a polygon generated by lines forming pairwise connections of base stations, etc.), be a position that depends on a plurality of GNSS receivers (e.g., a position that is within a threshold distance of a threshold number of GNSS receivers, a position determined for another GNSS receiver, etc.), be a previously determined VRS position (e.g., determined for a different GNSS receiver, determined at an earlier time, etc.), derived from the GNSS receiver locality (e.g., combine an estimated GNSS receiver locality and an estimated GNSS receiver velocity, trip plan, etc. such as to predict a direction of travel for the GNSS receiver and place the VRS position along or offset in the predicted direction of travel, a GNSS receiver path, etc.), be associated with a corrections tile (e.g., for tiled GNSS corrections, a tile center, a tile corner, etc.), and/or can be any suitable position. For example, as shown for instance in FIG. 5, the VRS position can be proximal (e.g., within about 1 km, 5 km, 10 km, 20 km, 50 km, 70 km, etc.) a GNSS receiver. However, the VRS position can be determined independent of the receiver locality (e.g., determined or set based on a geographic region that the GNSS receiver operates in, determined based on base stations or reference stations proximal the GNSS receiver, etc.) and/or otherwise be determined.

Receiving GNSS corrections S300 preferably functions to determine (e.g., look-up, access from database, access from a model, receive from a corrections generator, etc.) GNSS corrections for the GNSS receiver and/or the base station, but can determine any suitable GNSS corrections. The GNSS corrections are preferably received from a corrections generator (e.g., corrections modeler, global corrections modeler, local corrections modeler, database of corrections, corrections buffer, etc.), but can be received from any suitable source. The GNSS corrections can be associated with a spatial location (e.g., elevation, latitude, longitude, etc.), time, satellite, satellite constellation, error type, GNSS receiver (e.g., antenna), be general corrections, and/or be associated with any suitable information or data. In a specific example, GNSS corrections for a GNSS receiver are preferably determined based on the receive locality (and/or receiver position) can include any suitable errors. In a variation on this specific example, the GNSS corrections associated with a GNSS receiver can be associated with a base station and/or VRS proximal the GNSS receiver. Similarly, GNSS corrections for a base station can be determined based the base station location (e.g., a tile associated with the base station location). However, the GNSS corrections can otherwise be determined or selected.

The GNSS corrections can refer to SSR corrections, OSR corrections, and/or any suitable corrections. The GNSS corrections can include corrections for atmospheric effects (e.g., total electron count, vertical electron count, ionosphere delays or advances, troposphere delays, etc.), clock errors, orbit errors, hardware bias (e.g., GNSS receiver bias, satellite bias, etc.), multipath, cycle slip, ocean tide loading, antenna offsets, pole tides, and/or for any suitable error sources or faults. The GNSS corrections can be determined using a Gaussian model, a Kalman filter (e.g., Monte Carlo simulation), an extended Kalman filter, an unscented Kalman filter, a particle filter, and/or using nay suitable filter or algorithm. In specific examples, the SSR corrections can be generated and/or determined as disclosed in U.S. patent application Ser. No. 17/347,874 filed 15 Jun. 2021 entitled "SYSTEMS AND METHODS FOR DISTRIBUTED DENSE NETWORK PROCESSING OF SATELLITE POSITIONING DATA" or U.S. patent application Ser. No. 17/554,397 filed 17 Dec. 2021 entitled "SYSTEM AND METHOD FOR GAUSSIAN PROCESS ENHANCED GNSS CORRECTIONS GENERATION" each of which is incorporated herein in its entirety, and/or in any suitable manner.

In a specific example, the GNSS corrections (e.g., SSR corrections) can be determined (e.g., accessed, transmitted, selected, etc.) as disclosed in U.S. patent application Ser. No. 17/374,523 filed 13 Jul. 2021 entitled "SYSTEM AND METHOD FOR DETERMINING GNSS POSITIONING CORRECTIONS," U.S. patent application Ser. No. 17/379,271 filed 17 Jul. 2021 entitled "SYSTEM AND METHOD FOR PROVIDING GNSS CORRECTIONS" each of which is incorporated herein in its entirety, and/or in any suitable manner.

Figure 7:
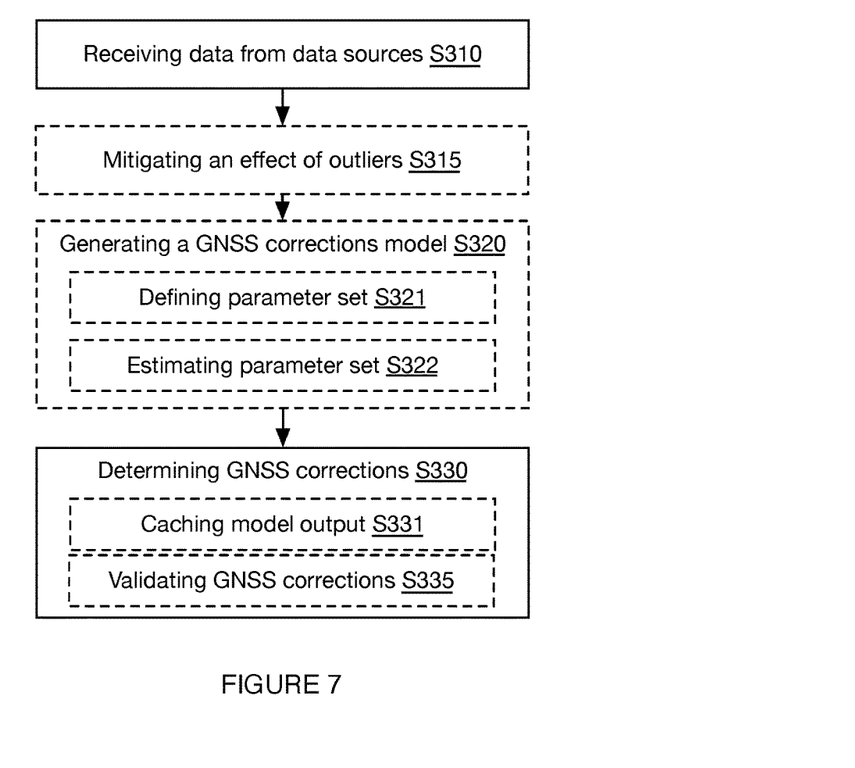
FIG. 7 is a schematic representation of an example of generating GNSS corrections (e.g., SSR corrections).

As shown for example in FIG. 7, generating GNSS corrections S300 (e.g., SSR corrections) can include: receiving data S310 (e.g., satellite signals, satellite observations associated with one or more reference station), mitigating an effect of outliers in the data S315 (e.g., using an outlier detection or mitigation technique as described in S100), determining a GNSS corrections model S320 (e.g., a Gaussian model, physical models, Kalman filter, extended Kalman filter, etc.), determining parameters of the model S321 (exemplary parameters can include covariance function(s); a functional relationship between variables such as a distance function, a time function, etc.; mapping functions; pierce points; data inputs; atmospheric shells such as shell thickness; number of shells; type of shell; etc.; hyperparameters; spatio-temporal scales such as spatial, temporal, etc. length scales; etc.), estimating parameters S322 (e.g., from previous model iterations, based on a set of training data, based on a set of tuning data, etc.), determining GNSS corrections S330 (e.g., evaluating the data using the model), caching the model output S331 (e.g., storing the GNSS corrections), validating the GNSS corrections S335 (e.g., by calculating a residual for one or more reference station observations corrected with the GNSS corrections and validating the GNSS corrections based on a threshold test, a statistical test such as a Student t-test, Bayesian testing, etc.), and/or any suitable steps.

Determining adjusted satellite observations S400 functions to determine synthetic satellite observations (e.g., adjusted GNSS corrections, adjusted satellite observations, VRS observations, etc.) which can be used for determining a PVT solution. The adjusted satellite observations can be associated with a VRS, a base station (e.g., a reference station), a GNSS receiver, and/or any suitable source. For example, adjusted satellite observations can refer to a satellite observation that would be predicted to be observed at a VRS position (e.g., satellite observations that would be observed at a location if a base station were at said position and observing satellite observations). However, adjust satellite observations can refer to any suitable data. The VRS observations are preferably determined by a remote computing system (e.g., and transmitted to the local computing system), but can be determined by the local computing system and/or by any suitable component.

The adjusted satellite observations can be determined based on (e.g., depend on) the GNSS receiver satellite observations, base station satellite observations, GNSS receiver corrections (e.g., SSR corrections predicted for a receiver, for a receiver tile, for a receiver locality, etc.), VRS receiver corrections (e.g., SSR corrections predicted for a VRS, for a VRS tile, for a VRS locality, etc.), base station receiver corrections (e.g., SSR corrections predicted for a base station, for a base station tile, for a base station locality, etc.), absolute corrections (e.g., reference information provided by a manufacturer, satellite operator, third party service, etc.), modelling, weather patterns, and/or any suitable information.

The adjusted satellite observations can be provided on a per satellite, per frequency, per epoch, per satellite constellation, per base station, per base station cluster, and/or on any suitable basis.

In a first specific example, an adjusted satellite pseudorange can be determined based on an RTK solution (e.g., a single base station) such as according to:

$$\rho_{VRS} = \rho_{Base} + \Delta_{SSR} = \rho_{Base} + (\rho_{VRS}^{SSR} - \rho_{base}^{SSR})$$

Where $\rho_{VRS}$ can be the pseudorange estimated (e.g., calculated, predicted) for the VRS, $\rho_{Base}$ can be the pseudorange measured by a base station, $\rho_{VRS}^{SSR}$ can be the pseudorange (or correction terms) predicted for the VRS location (e.g., the initial GNSS receiver position), and $\rho_{base}^{SSR}$ can be the pseudorange (or correction terms) predicted for the base station.

In a variation of this specific example, the adjusted satellite observations can be determined according to:

$$\rho_{VRS} = \rho_{VRS}^{SSR} - \Delta_{Base} = \rho_{VRS}^{SSR} - (\rho_{base}^{SSR} - \rho_{Base}).$$

These variations can have different physical interpretations (e.g., a VRS satellite observation is a base station observation corrected based on a difference in SSR between a base station and GNSS receiver, a VRS satellite observation is a GNSS receiver SSR correction that is adjusted based on a difference between a measured base station satellite observation and an SSR correction, etc.). The different physical interpretations can lead to different scalability, efficiency of corrections transfer to a plurality of GNSS receivers, speed of generation, number of corrections or adjust satellite observations to compute, and/or can led to any suitable differences. However, the different physical interpretations can have substantially the same efficiencies or results.

In a second variation of this specific example, an adjusted satellite observation can be determined using a network-RTK solution (e.g., based on two or more base stations). In the second variation, higher order terms (e.g., slope) can be corrected for based on the differences between a plurality of bases. In a first instance of the second variation, the adjust satellite observations can be given by $\rho_{VRS} = \rho_{VRS}^{SSR} - \Delta_{Base,1} - \Delta_{Base,2} = \rho_{VRS}^{SSR} - (\rho_{base,1}^{SSR} - \rho_{Base,1}) - (\rho_{base,2} - \rho_{Base,2})$, where base 1 and base 2 can refer to a first and a second reference station respectively. In a second instance, the adjusted satellite observations can be given by $\rho_{receiver}^{correction} = \rho_{receiver}^{SSR} - \Delta_{VRS} = \rho_{receiver}^{SSR} - (\rho_{VRS}^{SSR} - \rho_{VRS})$, where in the second instance, $\rho_{VRS}$ refers to a pseudorange for a VRS determined using network RTK methods and $\rho_{VRS}^{SSR}$ can refer to an SSR predicted pseudorange for a hypothetical base station coincident with the VRS position. However, network-RTK solutions can otherwise be integrated with this technique.

Related variations can be used to determine adjusted carrier phase observations (e.g., including a carrier phase ambiguity, a carrier phase ambiguity between locations, a carrier phase corresponding to distances between locations, etc.), adjusted doppler observations, and/or any suitable satellite signals. For instance, pseudorange can be replaced with carrier phase in the above illustrative equations (e.g., because carrier phase ambiguities can account for, accommodate, etc. residual error). In these variations, the carrier phase ambiguity can be levelled (e.g., by solving for the double difference carrier phase ambiguities between stations or using another method) such that the carrier phase ambiguities from different stations can be corrected to about the same value. Levelling the carrier phase ambiguity can provide a technical advantage of allowing carrier phases to be combined from multiple stations (e.g., as discussed above) and/or for the carrier phase corrections to be consistent when the user switches between nearest base stations. However, the adjusted satellite observations can otherwise be determined.

Determining adjusted satellite observations can include receiving spatially variant (e.g., atmospheric) corrections S350 (e.g., at a GNSS receiver, directly from a modeler such as an atmospheric corrections modeler, from S300, etc.), which can be beneficial for not generating synthetic observations (e.g., in these variation, a VRS location and/or VRS observations may not need to be generated), enhancing (e.g., facilitating, enabling, etc.) satellite constellation support (e.g., integrating with Glonass), and/or can otherwise be beneficial. For example, the corrected reference station observation correction can be determined according to: $P_{base}^{corrected} = P_{base} - A_{base} + A_{rover}$, where $P_{base}^{corrected}$ can be the adjusted (e.g., corrected) satellite observations (e.g., at a reference station, at a virtual reference station), $P_{base}$ can be the measured satellite observations, $A_{base}$ can be the atmospheric corrections (e.g., ionosphere delay or advance, troposphere delay, other spatially variant terms, etc. such as estimated by an atmospheric modeler) at the base station, and $A_{rover}$ can be the atmospheric corrections for the GNSS receiver. This example can be beneficial as it may not require synthetic observation generation (e.g., for a virtual reference station). However, any suitable corrections can be received and/or the satellite observations can be corrected in any manner.

In some variants, determining adjusted satellite observations can include updating (e.g., modifying, redetermining, etc.) a VRS position S370. These variants can be particularly beneficial as a GNSS receiver moves (e.g., to ensure that a distance between the GNSS receiver and the VRS does not exceed a threshold distance such as 0.1 km, 0.2 km, 0.5 km, 1 km, 2 km, 5 km, 10 km, 20 km, 5o km, 100 km, 120 km, 150 km, 200 km, values or ranges therebetween, etc.). Updating the VRS can be performed when the GNSS receiver has moved a threshold distance, when a distance between the VRS and the GNSS receiver exceeds a threshold distance, after a threshold time has elapsed (e.g., threshold number of epochs), at a predetermined frequency, when a model updates, randomly, and/or in response to any suitable criteria and/or with any timing. When the VRS position is updated, the VRS observations are preferably also updated (e.g., determined for the updated VRS position).

Updating the VRS position preferably does not, but in some situations can, result in an outage in a PVT solution and/or a decrease in the PVT solution accuracy. In specific examples, this can be realized using a graceful handoff technique (e.g., gradually shifting a weighting on carrier phase ambiguities between a prior VRS position or observation and an updated VRS position or observations), including an arbitrary ambiguity (e.g., that accounts for differences between a prior VRS position and an updated VRS position), by modifying a base station ambiguity (e.g., with a fixed VRS position), fixing a set of VRS positions (e.g., where updating the VRS position can include selecting a new VRS position, where each VRS position has a mutually consistent solution, where VRS solutions are smoothed, etc.), by including a between base station ambiguity, moving the VRS position gradually (e.g., to maintain the threshold distance without a discontinuous shift in VRS position), and/or can otherwise be realized.

Determining the receiver PVT solution S500 preferably functions to determine (e.g., estimate, calculate, etc.) a position, velocity, and/or precise time of the GNSS receiver. The PVT solution (e.g., positioning solution) is preferably determined using corrected satellite observations, but can be determined using uncorrected satellite observations. The corrected satellite observations are preferably determined using (e.g., based on) the adjusted satellite observations (e.g., VRS satellite observations), but can be determined using the SSR corrections, the base station observations, and/or any suitable information. The corrected satellite observations can refer to differenced satellite observations (e.g., single differenced, double differenced, triple differenced, etc.), combined satellite observations (e.g., wide-lane combination, ultrawide-lane combinations, narrow lane combinations, Melbourne-Wübbena combinations, Ionosphere-free combination, Geometry-free combination, wide-lane combinations, narrow-lane combinations, Group and Phase Ionospheric Calibration (GRAPHIC) combination, combinations using carrier phase and/or code measurements, Hatch-Melbourne-Wübbena, geometry-free and ionosphere-free combinations, etc.), undifferenced satellite observations (e.g., adjusted satellite observations for a receiver locality), and/or to any suitable satellite observations. As an illustrative example, the satellite observations used to determine the GNSS receiver PVT solution can be the satellite observations received by the GNSS receiver differenced with the VRS satellite observations. However, any suitable satellite observations can be used to determine the GNSS receiver position.

The PVT solution is preferably determined using carrier phase (e.g., ambiguity resolved carrier phase), but can additionally or alternatively be determined using pseudorange, doppler, and/or any suitable satellite signal(s). Determining the PVT solution can include determining the carrier phase ambiguity (e.g., to a floating point precision, to integer precision, etc. such as disclosed in U.S. patent application Ser. No. 16/817,196 filed 12 Mar. 2020 entitled "SYSTEMS AND METHODS FOR REAL TIME KINEMATIC SATELLITE POSITIONING" or in U.S. patent application Ser. No. 17/022,924 filed 16 Sep. 2020 entitled "SYSTEMS AND METHODS FOR HIGH-INTEGRITY SATELLITE POSITIONING" each of which is incorporated in its entirety herein), determining a set of floating phase ambiguity hypotheses, determining a set of integer phase ambiguity hypotheses from the set of floating phase ambiguity hypotheses, performing hypothesis testing to validate the set of integer phase ambiguities hypotheses, and/or any suitable steps.

Figure 3:
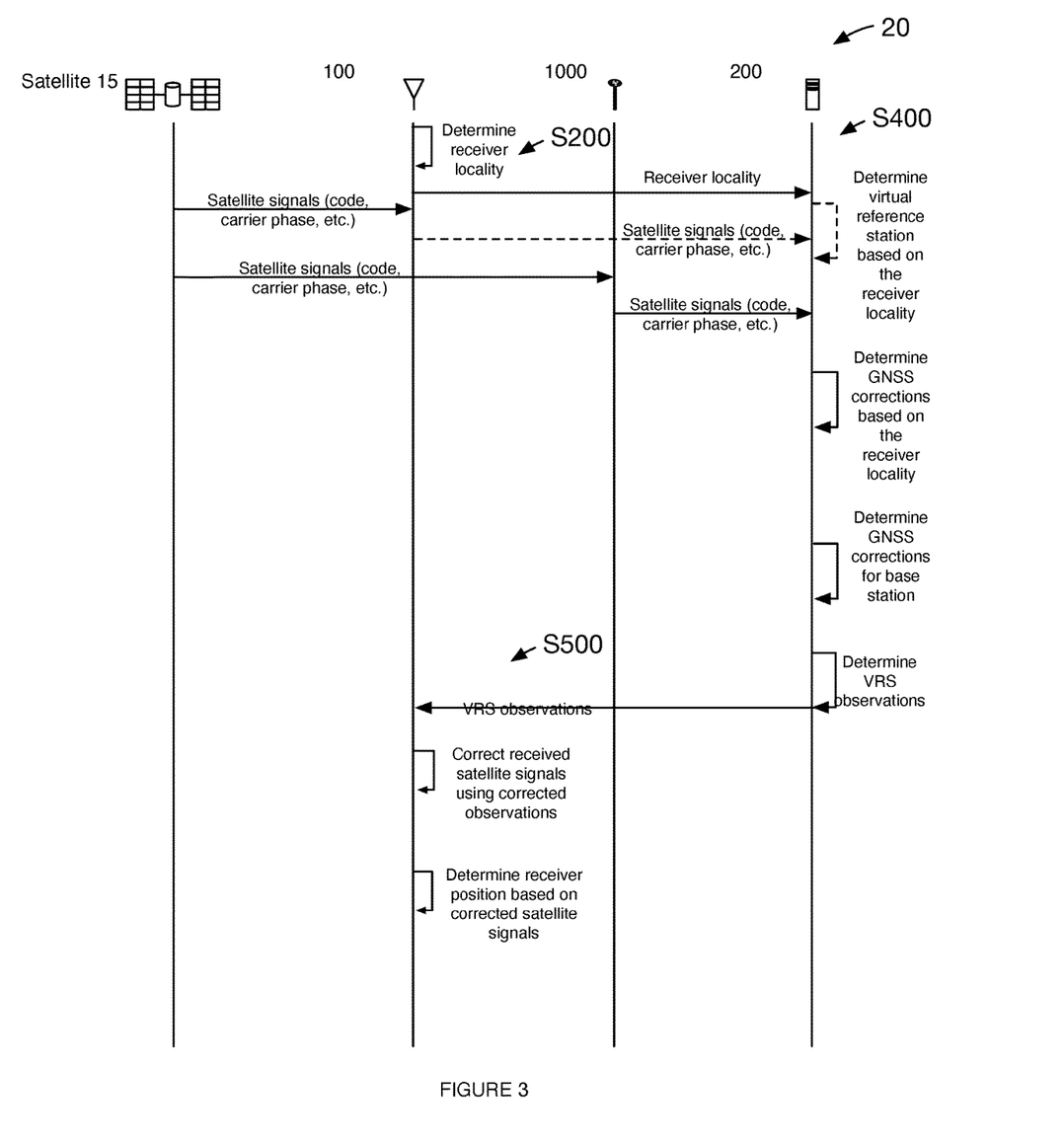
FIG. 3 is a flow diagrammatic representation of an example of the method.

In an illustrative example, as shown for instance in FIG. 3, a method can include: determining a receiver locality; at a GNSS receiver, receiving satellite signals; at a base station, receiving a second set of satellite signals; optionally, determining a virtual reference station location based on the receiver locality; determining SSR corrections at the VRS location; determining SSR corrections for the base station; combining (e.g., computing a difference between) the VRS SSR corrections, the base station SSR corrections and the base station satellite signals to determined corrected observations (e.g., synthetic observations, VRS observations, etc.); correcting the GNSS receiver satellite signals using the VRS observations; and determining the GNSS receiver PVT solutions based on the corrected satellite signals.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for determining a position of a mobile receiver comprising:
   determining a virtual reference station location associated with a virtual reference station;
   receiving satellite signals from a set of satellites and determining a set of GNSS satellite observations from the satellite signals at a reference station located at a reference station location, wherein each GNSS satellite observation of the set of GNSS satellite observations is associated with a satellite in-view of the reference station;
   determining a first GNSS correction for the virtual reference station location and a second GNSS correction for the reference station location;
   determining a second set of GNSS satellite observations for the virtual reference station by combining the set of GNSS satellite observations, the first GNSS correction, and the second GNSS correction by, for each GNSS satellite observation of the set of GNSS satellite observations:
      computing a first difference between the first GNSS correction and a respective GNSS satellite observation; and
      computing a second difference between the second GNSS correction and the first difference, wherein the respective GNSS satellite observation of the second set of GNSS satellite observations for the virtual reference station comprises the second difference;
   receiving satellite signals from a second set of satellites and determining a second set of GNSS satellite observations at the mobile receiver; and
   correcting the second set of GNSS satellite observations using the GNSS satellite observation for the virtual reference station, wherein the position of the mobile receiver is determined using the corrected second set of GNSS satellite observations.

2. The method of claim 1, wherein determining the virtual reference station location comprises setting the virtual reference station location to an initial locality of the mobile receiver.

3. The method of claim 1, further comprising updating the virtual reference station location to a second virtual reference station location when a distance between the virtual reference station and the position of the mobile receiver exceeds a threshold distance.

4. The method of claim 3, wherein the threshold distance is 10 kilometers.

5. The method of claim 3, wherein the second virtual reference station location comprises the position of the mobile receiver when the distance exceeds the threshold distance.

6. The method of claim 1, wherein determining the position of the mobile receiver comprises:
 determining a set of carrier phase ambiguity hypothesis for the second set of corrected GNSS satellite observations; and
 selecting a carrier phase ambiguity of the set of carrier phase ambiguity hypotheses based on results of a hypothesis test comparing carrier phase ambiguities of the set of carrier phase ambiguity hypotheses.

7. The method of claim 6, wherein the set of carrier phase ambiguity hypotheses comprises integer-valued carrier phase ambiguity hypotheses.

8. The method of claim 1, further comprising
 receiving satellite signals from a third set of satellites and determining a third set of GNSS satellite observations at a second reference station located at a second reference station location;
 determining a third GNSS correction for the second reference station location; and
 wherein determining the GNSS satellite observation for the virtual reference station comprises combining the set of GNSS satellite observations, the first GNSS correction, the second GNSS correction, the third set of GNSS satellite observations, and the third GNSS correction.

9. The method of claim 1, wherein the first GNSS correction and the second GNSS correction comprises state space representation corrections, wherein the GNSS satellite observation for the virtual reference station comprises an observation space representation.

\* \* \* \* \*